(12) United States Patent
Kehder

(10) Patent No.: US 10,059,312 B1
(45) Date of Patent: Aug. 28, 2018

(54) SWINGING MOUNT FOR TRAILER JACK

(71) Applicant: George Kehder, Saint Louis, MO (US)

(72) Inventor: George Kehder, Saint Louis, MO (US)

( * ) Notice: Subject to any disclaimer, the term of this patent is extended or adjusted under 35 U.S.C. 154(b) by 0 days.

(21) Appl. No.: 15/873,017

(22) Filed: Jan. 17, 2018

Related U.S. Application Data

(63) Continuation of application No. 15/497,923, filed on Apr. 26, 2017, now Pat. No. 9,889,825.

(51) Int. Cl.
B66F 1/02 (2006.01)
B60S 9/22 (2006.01)
E05D 7/00 (2006.01)
B60S 9/02 (2006.01)
E05D 7/04 (2006.01)

(52) U.S. Cl.
CPC . B60S 9/22 (2013.01); B60S 9/02 (2013.01); E05D 7/0009 (2013.01); E05D 7/04 (2013.01); B66F 1/02 (2013.01)

(58) Field of Classification Search
CPC ...... B66F 1/00; B66F 1/02; B66F 3/36; B66F 3/46; B66F 5/00; B66F 5/02; B66F 7/00; B66F 11/04; B66F 9/06; B66F 2700/00; B66F 9/02
USPC .......... 16/230, 231, 333, 244, 246, 343, 348
See application file for complete search history.

(56) References Cited

U.S. PATENT DOCUMENTS

| 986,913 A * | 3/1911 | Fardon | B62D 33/02 16/343 |
|---|---|---|---|
| 1,520,570 A * | 12/1924 | Haynes | D06F 57/00 16/343 |
| 2,596,543 A * | 5/1952 | Fox | A63B 63/083 16/343 |
| 6,450,465 B1 * | 9/2002 | Eslick | F16B 2/10 248/230.4 |
| 7,584,586 B2 * | 9/2009 | Decker | E04F 21/185 248/351 |
| 8,979,051 B2 * | 3/2015 | Keller | F16B 2/10 248/230.5 |
| 2002/0125388 A1 * | 9/2002 | Eslick | F16B 2/10 248/230.4 |
| 2005/0166363 A1 * | 8/2005 | Hoffman | B60J 5/0472 16/244 |

* cited by examiner

Primary Examiner — Nkeisha Smith
(74) Attorney, Agent, or Firm — Joseph E. Maenner; Petock and Petock, LLC

(57) ABSTRACT

In described embodiments, a trailer jack mount includes a first hinge plate mountable onto a frame of a vehicle. The first hinge plate has a first side hinge knuckle extending along a side of the first hinge plate and a first rear hinge knuckle extending along a length of the first hinge plate. A second hinge plate has a second side hinge knuckle hingedly connected to the first side hinge knuckle and a second rear hinge knuckle extending along a length of the second hinge plate. A locking bolt is removably insertable through the first rear hinge knuckle and the second rear hinge knuckle. The second hinge plate is rotatable between a first position wherein the second hinge plate is facing the first hinge plate and a second position wherein the second hinge plate is rotated away from the first hinge plate. In either the first position or the second position, the locking bolt is insertable through the first rear hinge knuckle and the second rear hinge knuckle to secure the first hinge plate and the second hinge plate in either the first position or the second position.

15 Claims, 6 Drawing Sheets

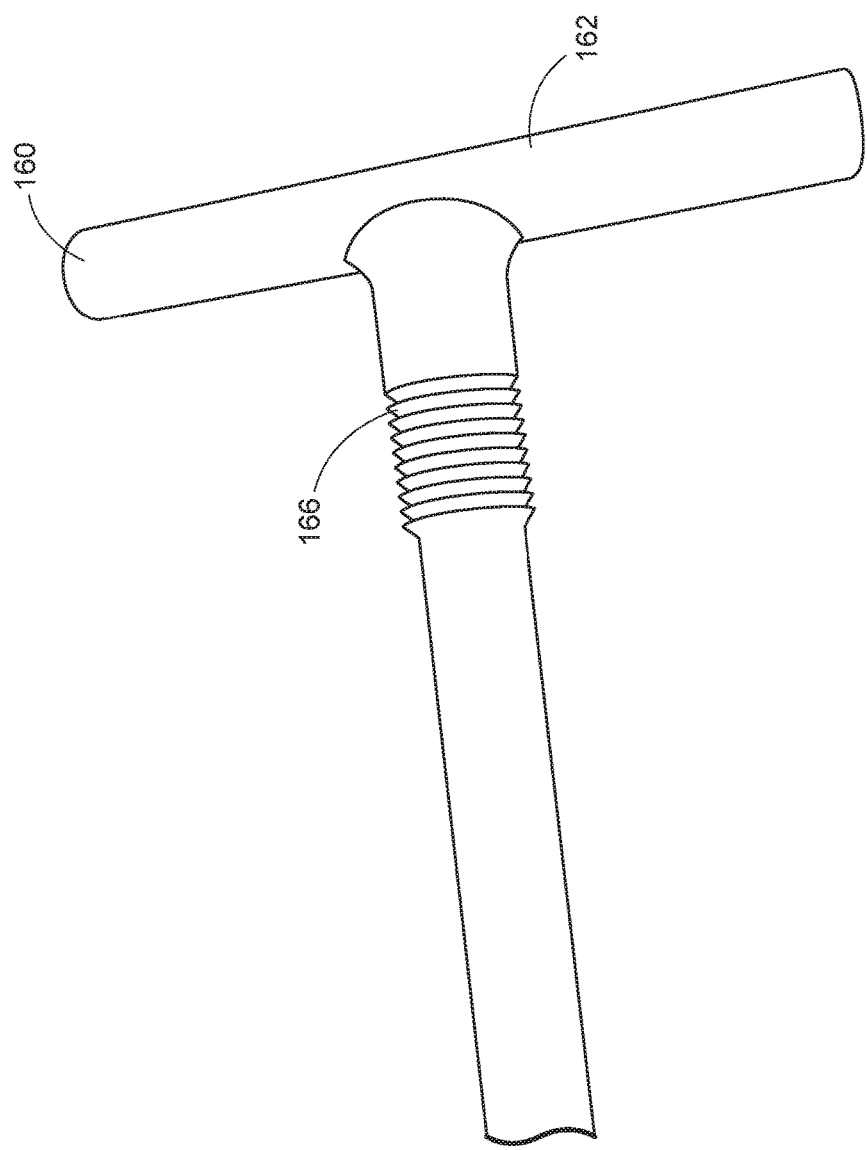

SWINGING MOUNT FOR TRAILER JACK

CROSS-REFERENCE TO RELATED APPLICATION

The present application is a continuation of U.S. patent application Ser. No. 15/497,923, filed on Apr. 26, 2017 (now allowed), which is incorporated herein by reference in its entirety.

BACKGROUND OF THE INVENTION

Field of the Invention

The present invention relates to a mount for a trailer jack that can be used in a travel position wherein a jack fixed to the mount extends upwards, providing sufficient ground clearance between the mount and the ground, and a use position wherein the jack extends downwards for use.

Description of the Related Art

Trailers that are pulled by vehicles include jacks that support an end of the trailer when the trailer is disengaged from the vehicle, such as for setting up a campsite. The jack extends downwardly from the frame of the trailer, resulting in a relatively low ground clearance that may result in the jack scraping against the ground when traversing relatively steeply angled terrain. This scraping may damage the jack.

It would be beneficial to provide a mounting system that can raise the jack when the trailer is in transit to avoid scraping the ground, yet still allow the jack to be easily deployed for use to support the trailer when required.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a trailer jack mount that includes a first hinge plate mountable onto a frame of a vehicle. The first hinge plate has a first side hinge knuckle extending along a side of the first hinge plate and a first rear hinge knuckle extending along a length of the first hinge plate. A second hinge plate has a second side hinge knuckle hingedly connected to the first side hinge knuckle and a second rear hinge knuckle extending along a length of the second hinge plate. A locking bolt is removably insertable through the first rear hinge knuckle and the second rear hinge knuckle. The second hinge plate is rotatable between a first position wherein the second hinge plate is facing the first hinge plate and a second position wherein the second hinge plate is rotated away from the first hinge plate. In either the first position or the second position, the locking bolt is insertable through the first rear hinge knuckle and the second rear hinge knuckle to secure the first hinge plate and the second hinge plate in either the first position or the second position.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 6 is an enlarged perspective view of the handle end of the locking bolt.

DETAILED DESCRIPTION

Figure 1:
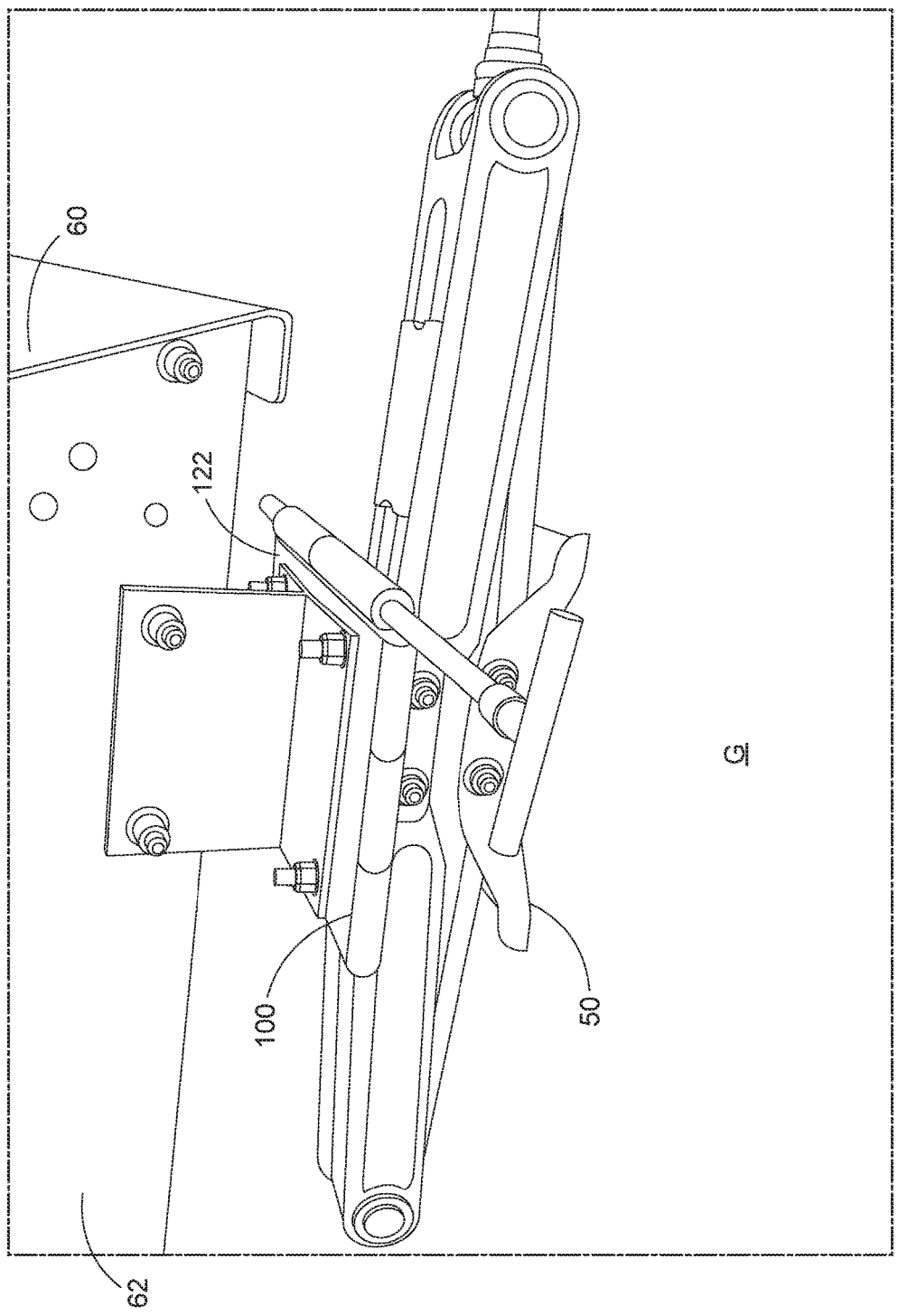
FIG. 1 is a perspective view of a trailer mount according to an exemplary embodiment of the present invention, with the mount and a jack in a "use" position.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the terms "front", "rear", "left", and "right" are used in reference to commonly understood locations on a vehicle.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Referring to the Figures, a swinging mount 100 for a trailer jack 50 is shown. While mount 100 is shown for use with jack 50, those skilled in the art will recognize that mount 100 can be used for other devices, such as a trailer hitch, where a standard mounting configuration is too low to the ground and can result in inadvertent scraping and possible damage of the device if it encounters a steep grade.

Figure 2:
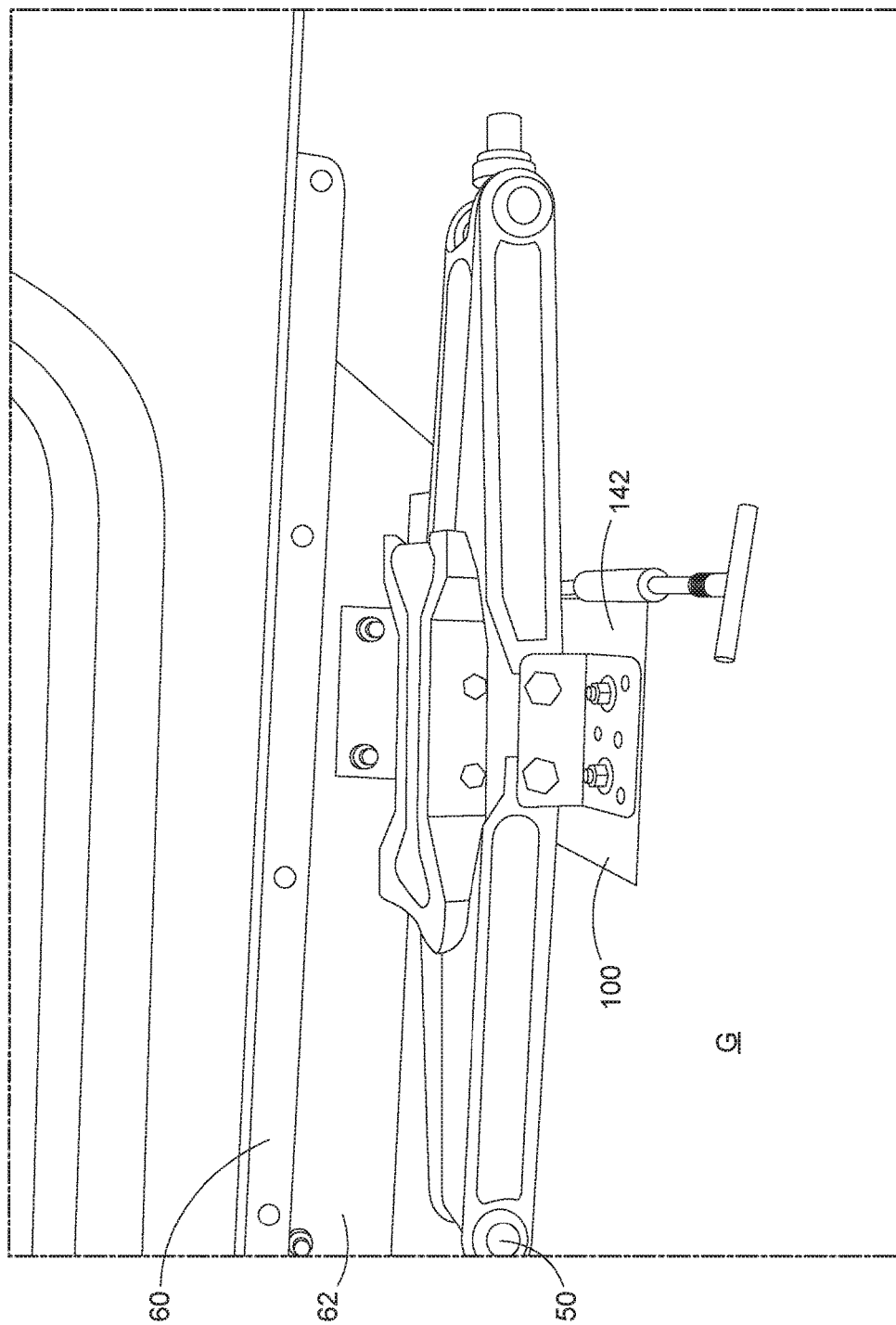
FIG. 2 is a perspective view of the mount and jack shown in FIG. 1, with the mount and the jack in a "transit" position.

Mount 100 is operable between a closed, or "use" position, shown in FIG. 1, wherein jack 50 extends downwardly from mount 100 and can be extended to lift/support an end of trailer 50 off the ground and an open or "transit" position, shown in FIG. 2, wherein jack 50 is rotated about mount 100 so that jack 50 is above mount 100 to avoid scraping the ground.

Figure 3:
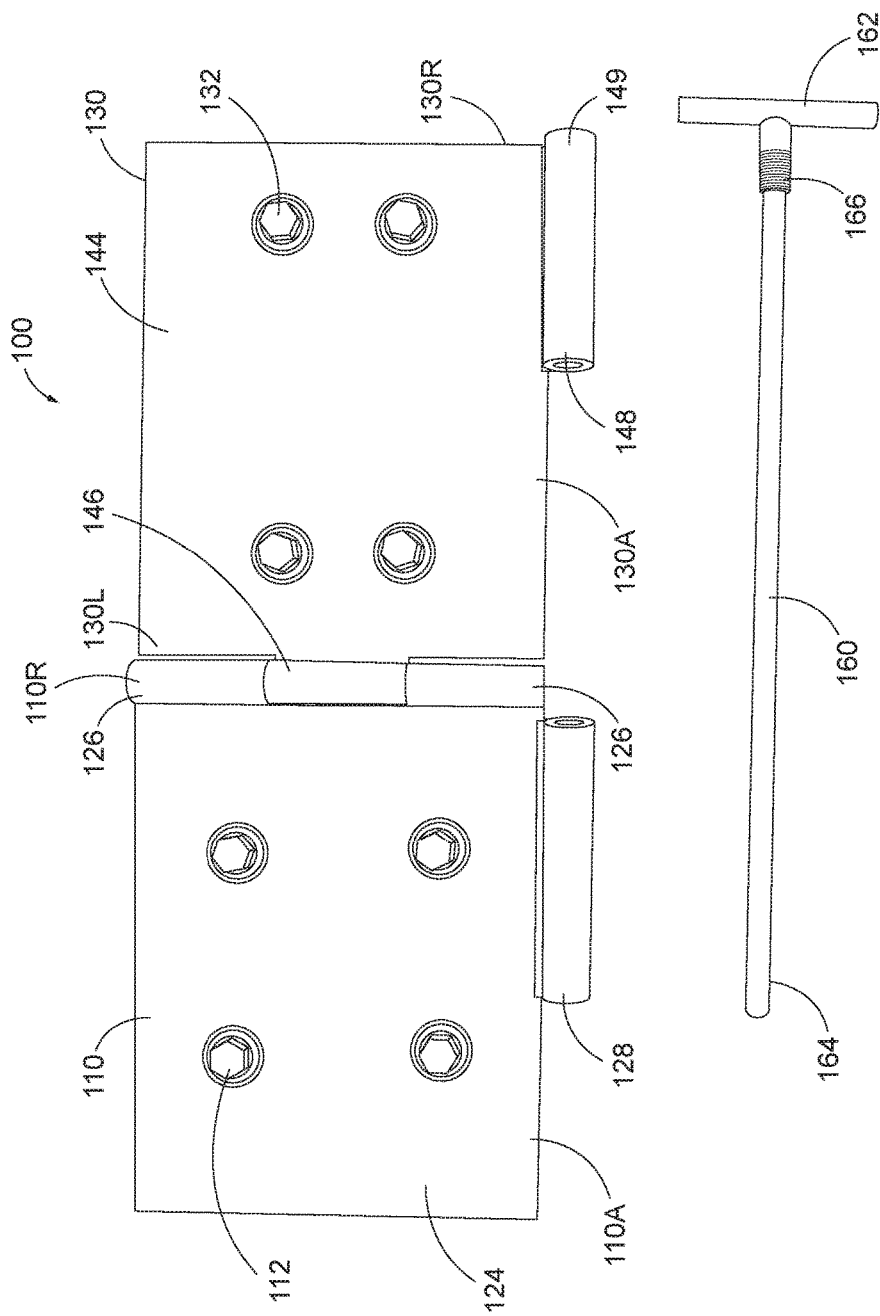
FIG. 3 is a to plan view of the mount shown in FIG. 1 in the transit position.
Figure 4:
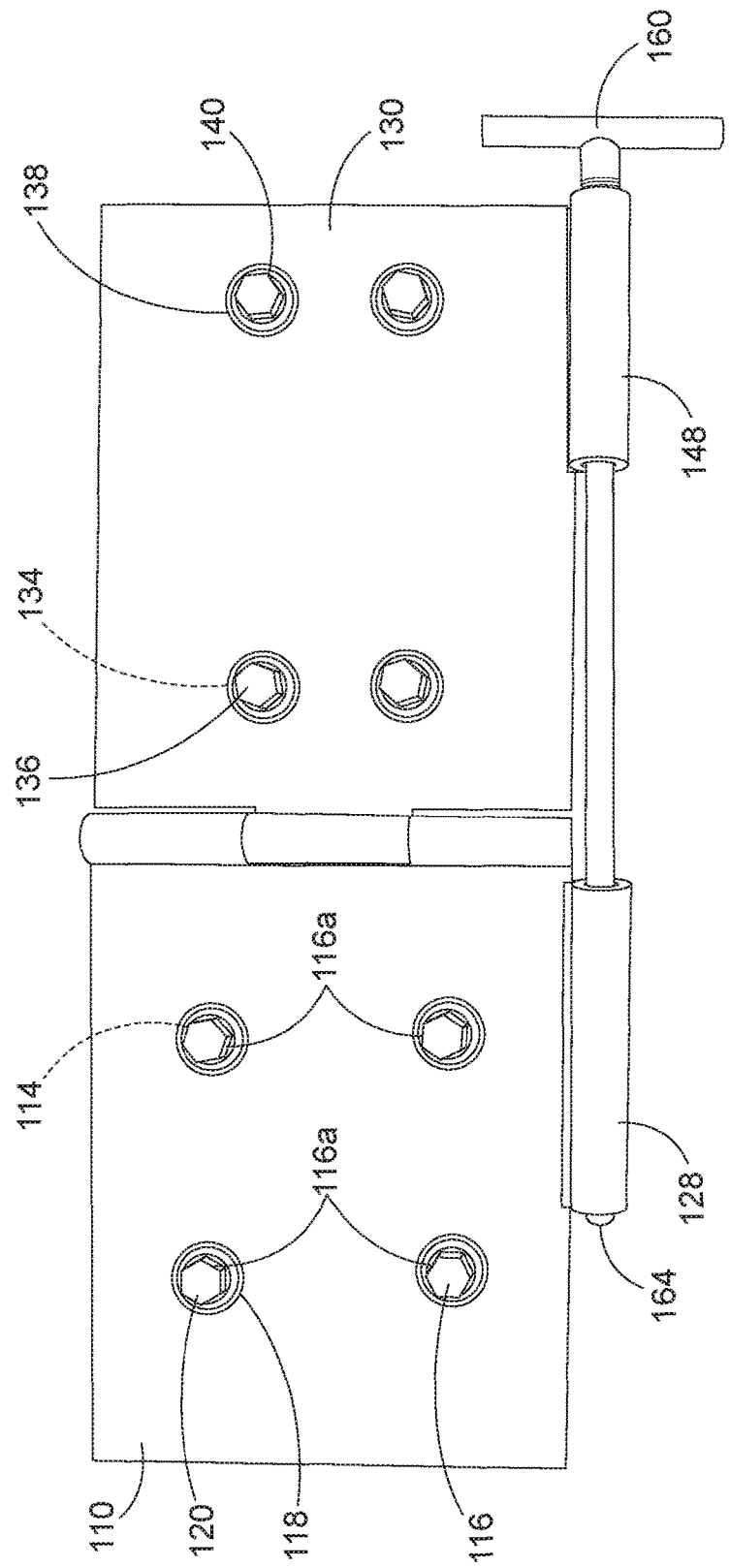
FIG. 4 is a to plan view of the mount shown in FIG. 3, with a locking bolt locking the mount in the transit position.

Referring to FIGS. 3 and 4, mount 100 includes a top plate 110 hingedly connected to a bottom plate 130. Top plate 110 is bolted to the frame 62 of a vehicle 60, such as a trailer, a truck, or other vehicle, while bottom plate 130 is bolted to jack 50 (or a trailer hitch or other such device). Each of top plate 110 and bottom plate 130 is generally rectangular in size, having an exemplary length of about 8 inches and an exemplary width of about 6 inches. Each of top plate 110 and bottom plate 130 can be constructed from carbon steel having a thickness of about ⅛ inches.

Top plate 110 includes a first bolt pattern 112 of at least four (4) bolt holes 114, although those skilled in the art will recognize that bolt pattern 112 can include more than four (4) bolt holes 114. Bolt holes 114 are spaced a first distance from each other such that a line drawn between adjacent bolt holes 114 forms a rectangle or a square. Bolt pattern 112 is sized to align with frame 62 of vehicle 60 so that mount 100 can be fixedly bolted to vehicle 60.

A nut and bolt assembly 116 (shown in FIG. 4) is provided for each bolt hole to secure mount 100 to frame 62. Additionally, washers 118 are provided for installation around bolts 116a between bolt head 120 and top plate 110 for spacing purposes, as will be explained in detail later herein.

A top face 122 of top plate 110 engages frame 62, while a bottom face 124 of top plate 110 extends downwardly and engages washers 118.

Referring to mount 100 in the transit position of FIG. 2, as shown in FIG. 3, right side 110R of top plate 110 includes at least one, and preferably, a plurality of hinge knuckles 126 extending in a front-to-rear direction along side 110R. Additionally, a rear side 110A of plate 110 includes a knuckle 128. Knuckle 128 extends from side 110R and extends about half the length of top plate 110 toward a center of rear side 110A. FIG. 3 shows that, when mount 100 is in the transit position, top plate 110 and bottom plate 130 extend in a common plane.

Bottom plate 130 includes a second bolt pattern 132 of at least four (4) bolt holes 134, although those skilled in the art will recognize that bolt pattern 132 can include more than four (4) bolt holes 134. Bolt holes 134 are spaced a second distance from each other such that when mount 100 is in the closed position, bolt holes 134 do not overlap bolt holes 114. Bolt pattern 132 is sized to align with bolt holes on jack 50 so that jack 50 can be fixedly bolted to mount 100.

A nut and bolt assembly 136 is provided for each bolt hole to secure jack 50 to mount 100. Additionally, washers 138 are provided for installation around bolts 136a between bolt head 140 and bottom plate 130 for spacing purposes. As described in the use position, a bottom face 142 of bottom plate 130 engages jack 50, while a top face 144 of bottom plate 130 extends upwardly and engages washers 138. Washers 118 and 138 are selected so that, when mount 100 is in the use position, at least one of bolt heads 120 engages bottom plate 130 or bolt heads 140 engage top plate 110 to restrict movement of bottom plate 130 with respect to top plate 110 when mount 100 is in the transit position.

A left side 130L of bottom plate 130 include at least one hinge knuckle 146 that extends between hinge knuckles 126 on plate 110. Additionally, a rear side 130A of bottom plate 130 includes a knuckle 148. Knuckle 148 extends from side 130R and extends about half the length of bottom plate 130 toward a center of rear side 130A. Knuckle 148 has internal threads 149 at least partially therethrough beginning at side 130R.

Hinge knuckles 146 mate with hinge knuckles 126 to form a swing hinge. Knuckle 148 cooperates with knuckle 128 to form a locking assembly. When bottom plate 130 is in each of the use and transit positions, knuckles extend 128, 148 extend co-axially.

Mount 100 can be switched from a "left-handed" mount to a "right-handed" mount simply by adjusting the location of knuckles 128, 148. For a "right-handed mount, knuckles 128, 148 can be located at the rear of mount 100 and for a "left-handed" mount, mount 100 can be rotated 180 degrees so that knuckles 128, 148 are located at the front of mount 100.

Figure 5:
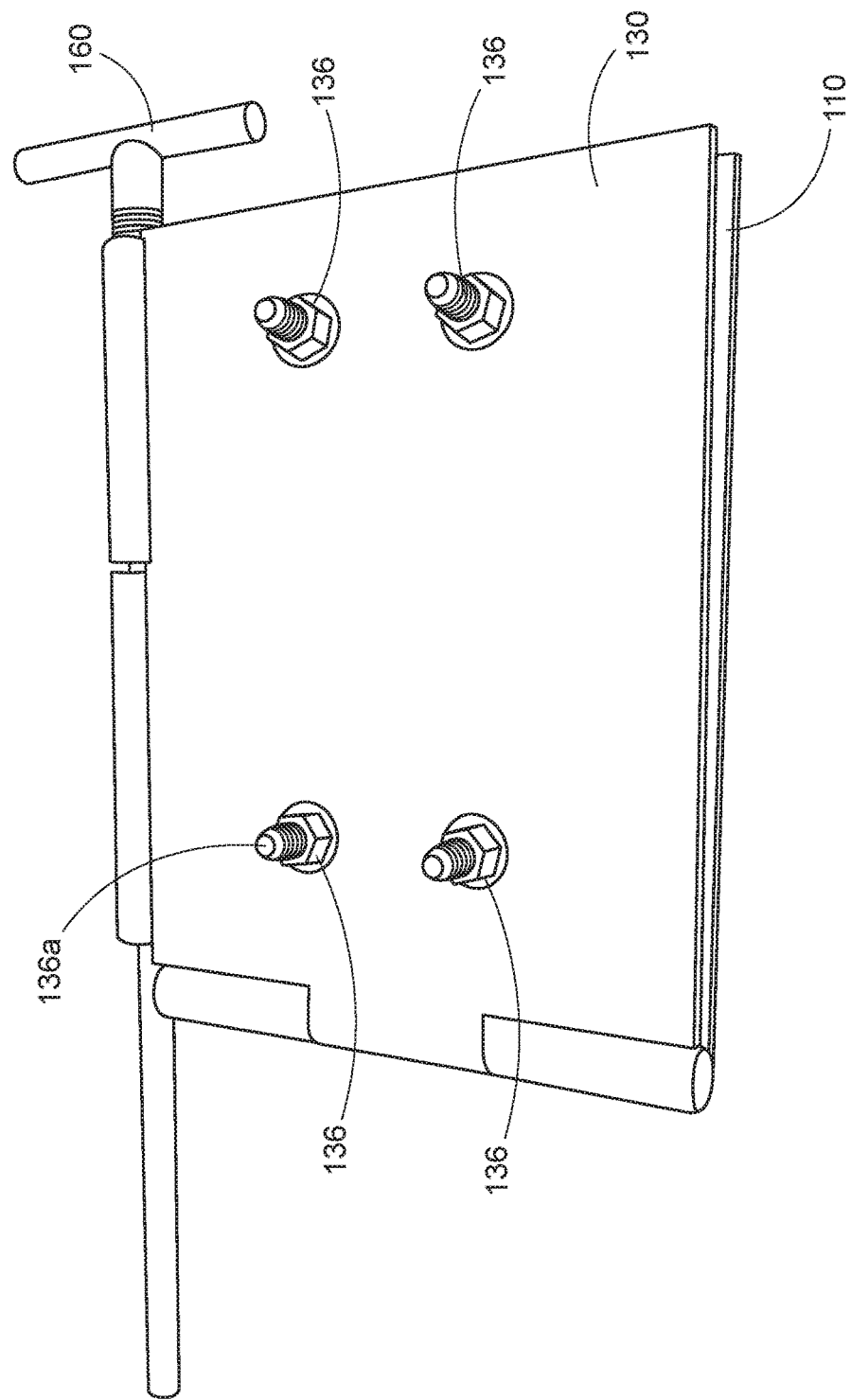
FIG. 5 is a perspective view of the mount shown in FIG. 4, with the locking bolt locking the mount in the use position.

A locking bolt 160 is removably insertable through knuckles 128, 148 and is used to secure mount 100 in either the transit position, shown in FIG. 4, or the use position, shown in FIG. 5 to lock bottom plate 130 in position relative to top plate 110.

Locking bolt 160 is sufficiently long to extend through knuckles 128, 148 in the transit position. Referring to FIGS. 3 and 6, locking bolt 160 has a tee handle 162 that can be used to grasp and rotate locking bolt 160, and a free end, 164, distal from tee handle 162, that is insertable through knuckles 128, 148. A portion of bolt 160 adjacent to tee handle 162 includes threads 164 that threadingly engage threads 149 inside knuckle 148 to secure locking bolt 160 within knuckle 148 and maintain plate 110 in a desired position relative to bottom plate 130, such as when mount 100 is in the transit position.

When mount 100 is in a use position, as shown in FIG. 1, bottom plate 130 is rotated so that bottom plate 130 is facing top plate 110. Locking bolt 160 is insertable through knuckles 128, 148 so that bottom plate 130 and top plate 110 are secured in the facing position. Although locking bolt 160 can be rotated so that threads 166 engage threads 149, those skilled in the art will recognize that such threaded connection is not required in the use position. In the use position, jack 50 can be operated to support vehicle 60 on ground "G".

To convert mount 100 from the use position shown in FIG. 1 to the transit position in FIG. 2, vehicle 60, in this case, a trailer, can be attached to its towing vehicle (not shown) and jack 50 can be retracted from ground G. Locking bolt 160 is removed from knuckles 128, 148 and bottom plate 130 is rotated 180 degrees so that bottom plate 130 is rotated away from top plate 110 to the position shown in FIG. 2, with jack 50 extending upwardly above bottom plate 130. Jack 50 now has a much higher clearance from ground G than in the use position.

With bottom plate 130 rotated away from top plate 110, locking bolt 160 is inserted through knuckles 128, 148 and rotated so that threads 166 engage threads 149 in knuckle 148 so that locking bolt 160 does not inadvertently disengage from knuckles 128, 148. Mount 100 is now secured in the transit position.

Alternatively, instead of using locking bolt 160 to secure bottom plate 130 in the transit position, a first end of an attachment mechanism (not shown) can be attached to bottom plate 130, with a second end of the attachment mechanism removably attachable to a portion of frame 62. The attachment mechanism can be a hook, a turnbuckle, a strap, or other suitable mechanism for securing bottom plate 130 to prevent bottom plate 130 from excessive movement during transit.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A trailer jack mount comprising:
   a top plate having a first knuckle;
   a bottom plate having a second knuckle;
   a hinge assembly hingedly connecting the top plate to the bottom plate, the hinge assembly extending orthogonally with respect to the first and second knuckles; and
   a locking bolt removably insertable into both of the first and second knuckles such that the locking bolt is insertable into the first and second knuckles when the bottom plate is in a first position relative to the top plate and when the bottom plate is in a second position relative to the top plate.

2. The trailer jack mount according to claim 1, wherein the locking bolt is threadably insertable into one of the first and second knuckles.

3. The trailer jack mount according to claim 1, wherein the top plate is releasably connectable to a frame and wherein the bottom plate is releasably connectable to a jack.

4. The trailer jack mount according to claim 1, wherein the second position is rotated 180 degrees from the first position.

5. The trailer jack mount according to claim 1, wherein, when the top plate and the bottom plate are in the second position, the top plate and the bottom plate extend in a common plane.

6. The trailer jack mount according to claim 1, wherein, when the bottom plate is in each of the first and second position, the first and second knuckles extend co-axially.

7. The trailer jack mount according to claim 1, wherein the top plate comprises a first bolt pattern and the bottom plate comprises a second hinge pattern such that, when the bottom plate is in the first position, the first bolt pattern and the second bolt pattern are not overlapping.

8. The trailer jack mount according to claim 7, wherein a first set of bolts is insertable through the first bolt pattern and wherein a second set of bolts is insertable through the second bolt pattern and wherein, when the bottom plate is in the first position, the bottom plate engages the first set of bolts.

9. The trailer jack mount according to claim 7, wherein a first set of bolts is insertable through the first bolt pattern and wherein a second set of bolts is insertable through the second bolt pattern and wherein, when the bottom plate is in the first position, the top plate engages the second set of bolts.

10. The trailer jack mount according to claim 1, wherein the first knuckle extends about half the length of the top plate and wherein the second knuckle extends about half the length of the bottom plate.

11. The trailer jack mount according to claim 1, wherein the second knuckle has a threaded interior.

12. The trailer jack mount according to claim 11, wherein the locking bolt has a threaded exterior adapted to threadingly engage the threaded interior of the second knuckle.

13. A trailer jack mount comprising:
    a top plate;
    a bottom plate hingedly connected to the top plate along a hinge; and
    a locking bolt removably insertable into both the top plate and the bottom plate, orthogonally to the hinge, to lock the top plate and the bottom plate in one of a first position wherein the bottom plate faces the top plate and a second position wherein the bottom plate extends co-planar with the top plate.

14. The trailer jack mount according to claim 13, wherein the top plate is releasably connectable to a frame and wherein the bottom plate is releasably connectable to a jack.

15. The trailer jack mount according to claim 13, wherein the top plate comprises a first knuckle and the second plate comprises a second knuckle, and wherein when the top plate and the bottom plate are in the first position and in the second position, the locking bolt is insertable through the first knuckle and the second knuckle.

* * * * *